United States Patent
Nakajima

(10) Patent No.: US 10,367,685 B2
(45) Date of Patent: Jul. 30, 2019

(54) COMMUNICATION DEVICE, CONTROL METHOD OF COMMUNICATION DEVICE, AND STORAGE MEDIUM, FOR PERFORMING WIRELESS COMMUNICATION

(71) Applicant: CANON KABUSHIKI KAISHA, Tokyo (JP)

(72) Inventor: Takafumi Nakajima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/564,682

(22) PCT Filed: Mar. 30, 2016

(86) PCT No.: PCT/JP2016/001833
§ 371 (c)(1),
(2) Date: Oct. 5, 2017

(87) PCT Pub. No.: WO2016/163103
PCT Pub. Date: Oct. 13, 2016

(65) Prior Publication Data
US 2018/0091365 A1    Mar. 29, 2018

(30) Foreign Application Priority Data
Apr. 9, 2015   (JP) .................. 2015-080447

(51) Int. Cl.
*H04L 12/24*   (2006.01)
*H04W 4/08*   (2009.01)
(Continued)

(52) U.S. Cl.
CPC .......... *H04L 41/0803* (2013.01); *H04L 63/10* (2013.01); *H04L 67/1044* (2013.01);
(Continued)

(58) Field of Classification Search
CPC ............ G06F 17/30879; G06K 7/1417; H04L 41/0803; H04L 63/10; H04L 67/1044;
(Continued)

(56) References Cited

U.S. PATENT DOCUMENTS

2013/0050259 A1*  2/2013  Ahn .................. G06F 3/1454
345/633
2013/0100855 A1*  4/2013  Jung .................... H04W 12/06
370/254
(Continued)

FOREIGN PATENT DOCUMENTS

EP   2252094 A2   11/2010
EP   2991434 A1   3/2016
(Continued)

*Primary Examiner* — Kan Yuen
(74) *Attorney, Agent, or Firm* — Canon U.S.A., Inc. IP Division

(57) ABSTRACT

If first another communication device and second another communication device are wirelessly connected with one another on the basis of information acquired from a captured image, a communication device as a slave station connects with a wireless network constructed by the second another communication device as a base station, and makes communication for sharing a communication parameter with the second another communication device.

15 Claims, 7 Drawing Sheets

(51) Int. Cl.
  *H04W 40/24* (2009.01)
  *H04L 29/08* (2006.01)
  *H04W 76/10* (2018.01)
  *H04L 29/06* (2006.01)
  *H04W 4/80* (2018.01)
  *G06F 16/955* (2019.01)
  *H04W 12/06* (2009.01)
  *H04W 84/12* (2009.01)
  *H04W 88/04* (2009.01)
  *G06K 7/14* (2006.01)
  *H04W 84/20* (2009.01)
  *H04W 88/08* (2009.01)

(52) U.S. Cl.
  CPC ........... *H04L 67/2809* (2013.01); *H04W 4/08* (2013.01); *H04W 40/24* (2013.01); *H04W 76/10* (2018.02); *G06F 16/9554* (2019.01); *G06K 7/1417* (2013.01); *H04W 4/80* (2018.02); *H04W 12/06* (2013.01); *H04W 84/12* (2013.01); *H04W 84/20* (2013.01); *H04W 88/04* (2013.01); *H04W 88/08* (2013.01)

(58) Field of Classification Search
  CPC .. H04L 67/2809; H04W 12/06; H04W 40/24; H04W 4/08; H04W 4/80; H04W 76/10; H04W 84/12; H04W 84/20; H04W 88/04; H04W 88/08
  See application file for complete search history.

(56) References Cited

U.S. PATENT DOCUMENTS

| | | | |
|---|---|---|---|
| 2014/0056209 A1* | 2/2014 | Park | H04W 16/26 370/315 |
| 2014/0269646 A1 | 9/2014 | Ramasamy | |
| 2015/0023649 A1* | 1/2015 | Wang | H04N 21/43637 386/231 |

FOREIGN PATENT DOCUMENTS

| | | |
|---|---|---|
| JP | 2013214802 A | 10/2013 |
| JP | 2014-060623 A | 4/2014 |
| JP | 2014-078771 A | 5/2014 |
| JP | 2014-230152 A | 12/2014 |
| JP | 5771604 B2 | 9/2015 |
| WO | 2013/175674 A1 | 11/2013 |
| WO | 2014190950 A1 | 12/2014 |

* cited by examiner

[Fig. 1]
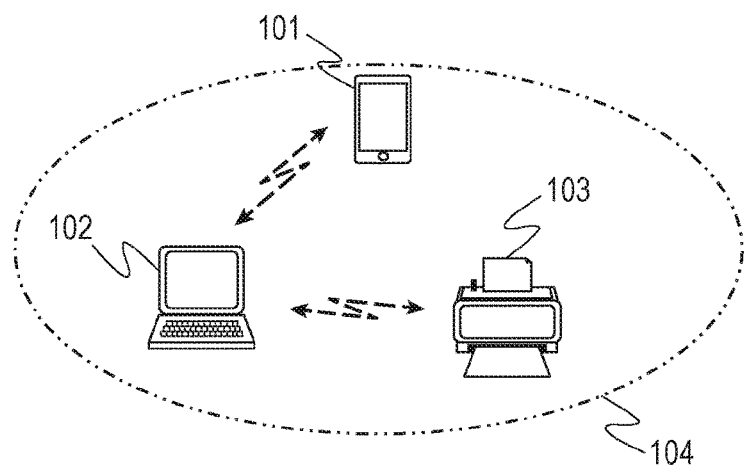
[Fig. 2]
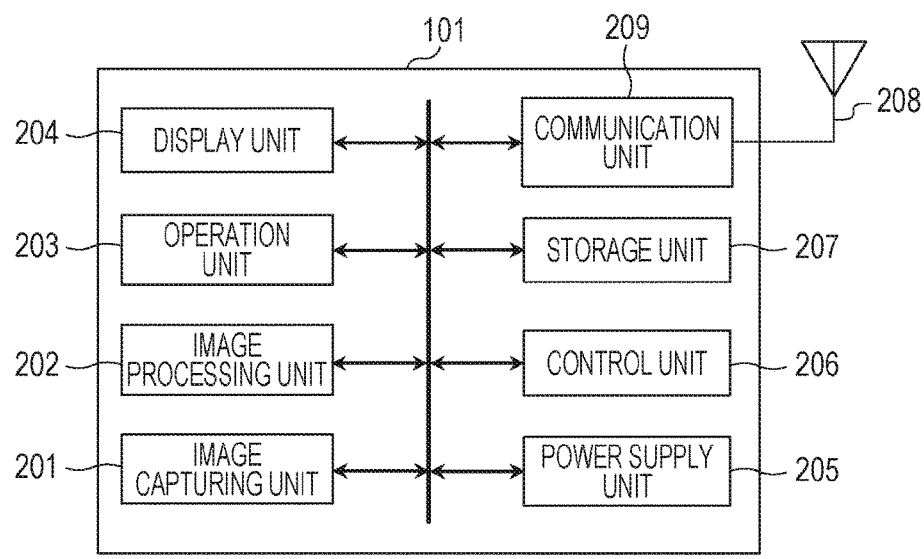

[Fig. 3]
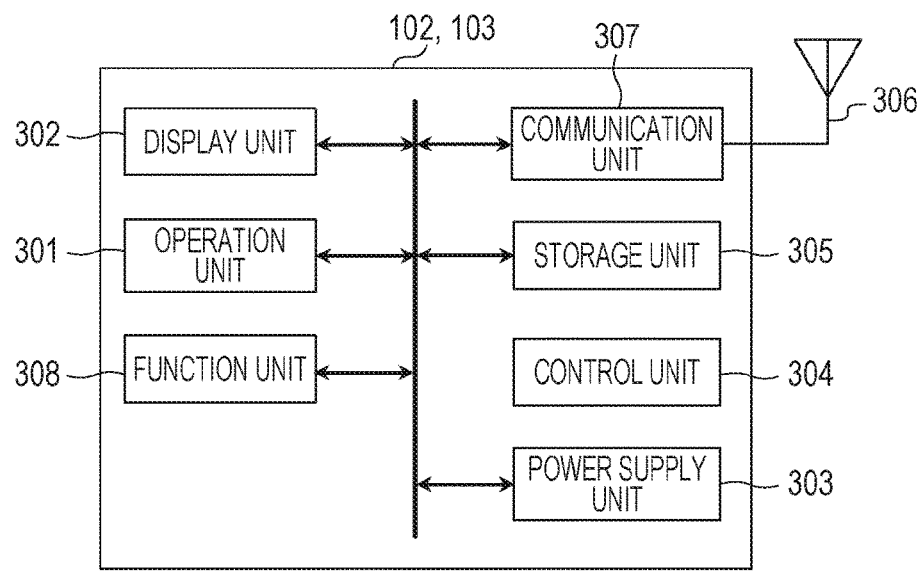

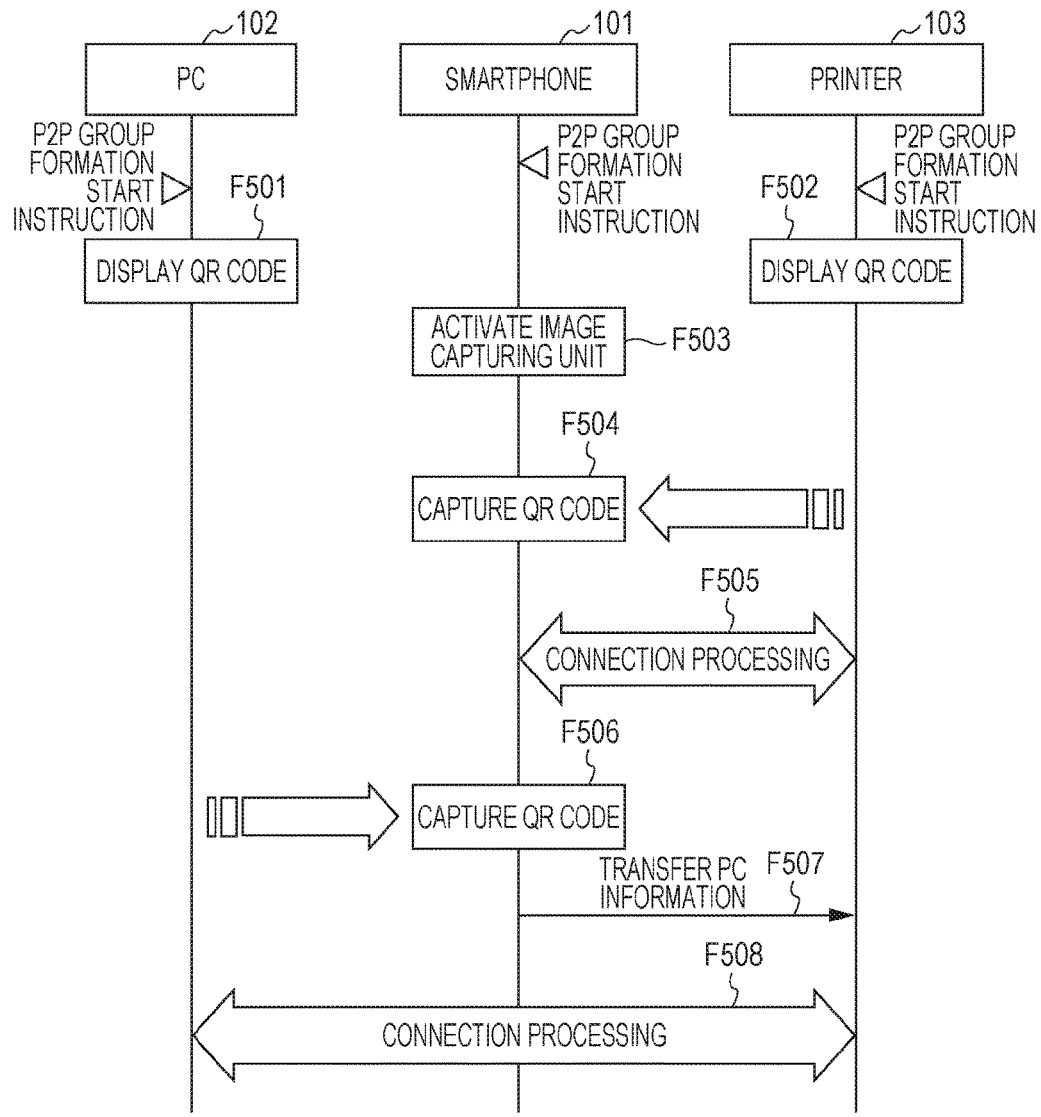

[Fig. 5]
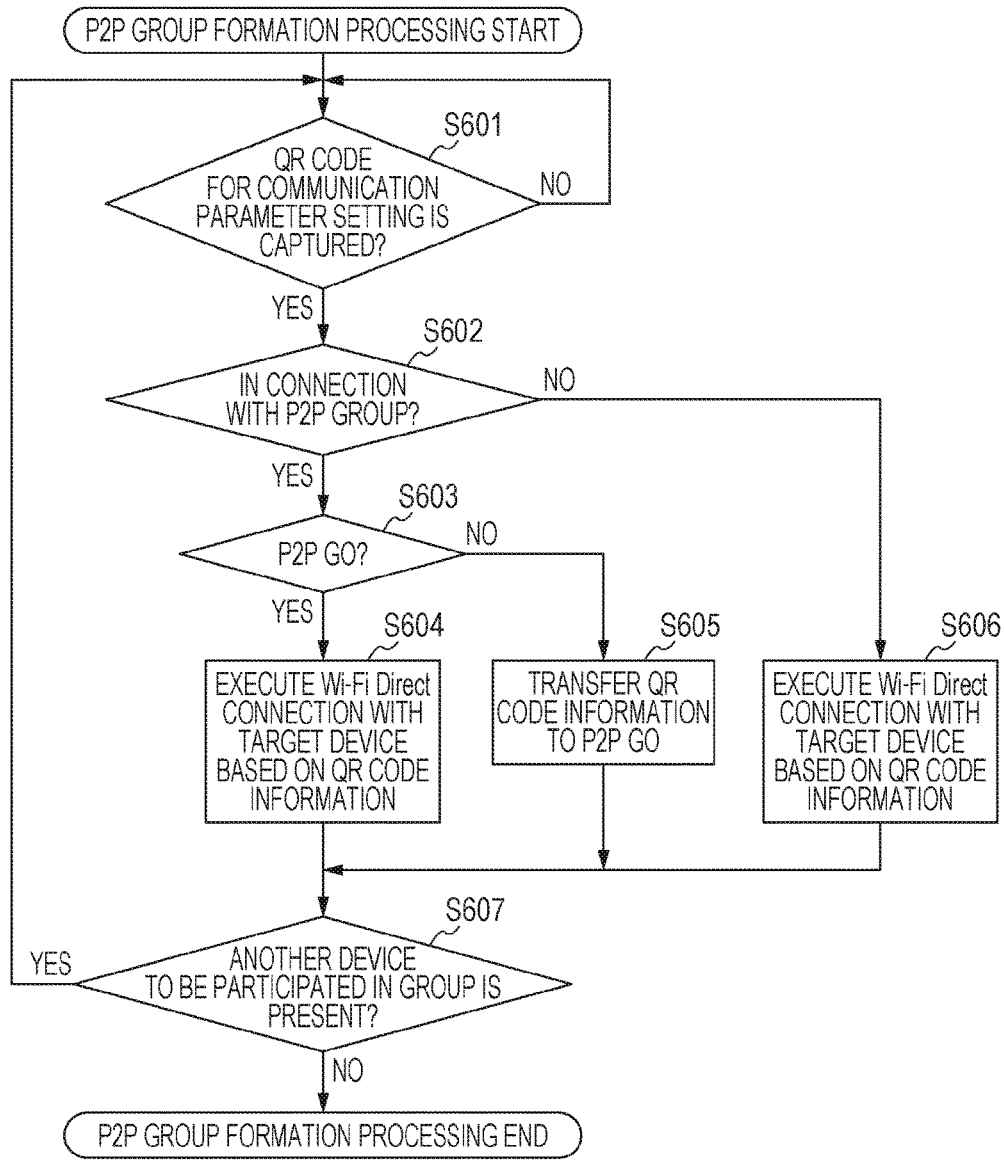

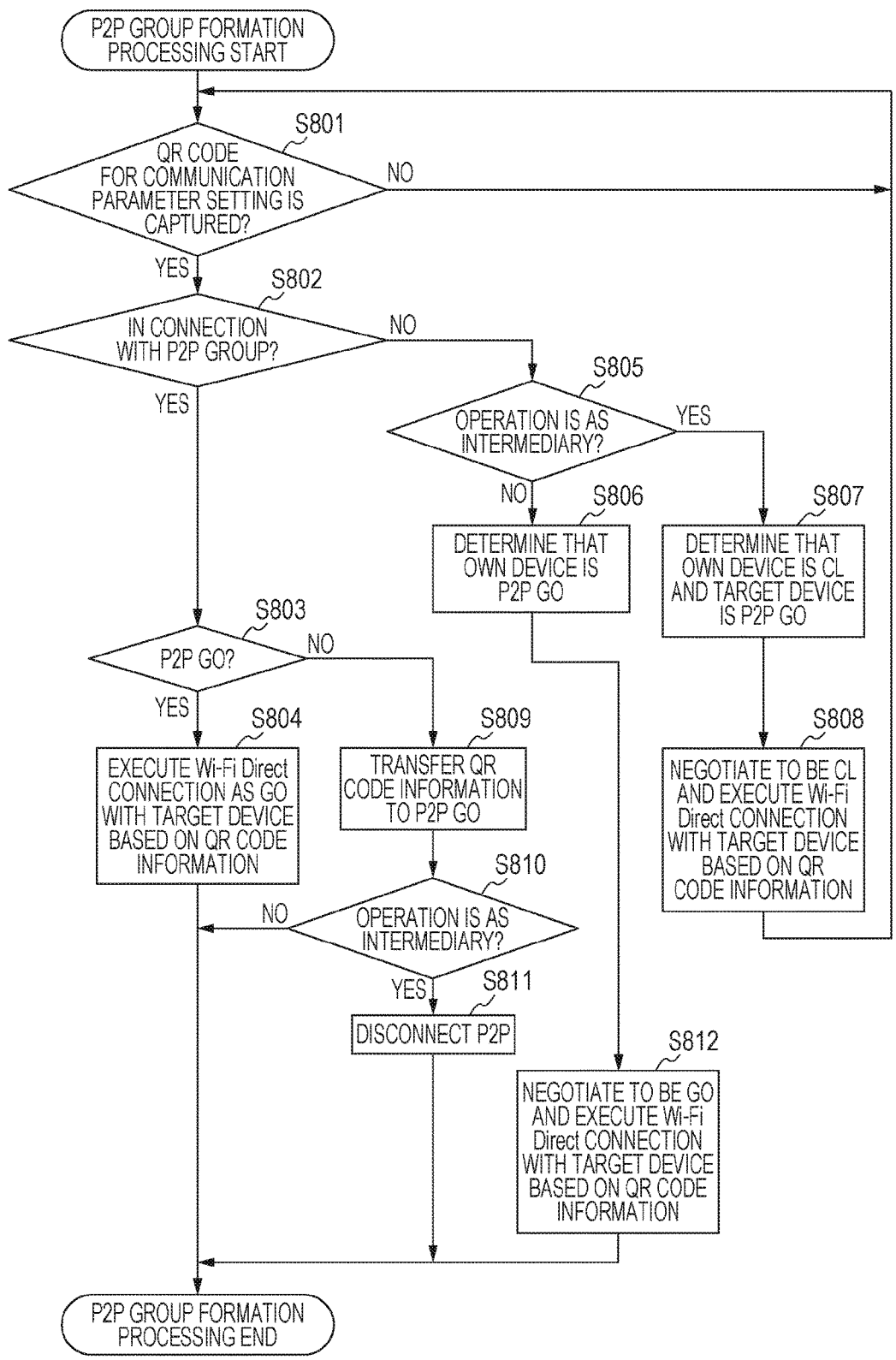

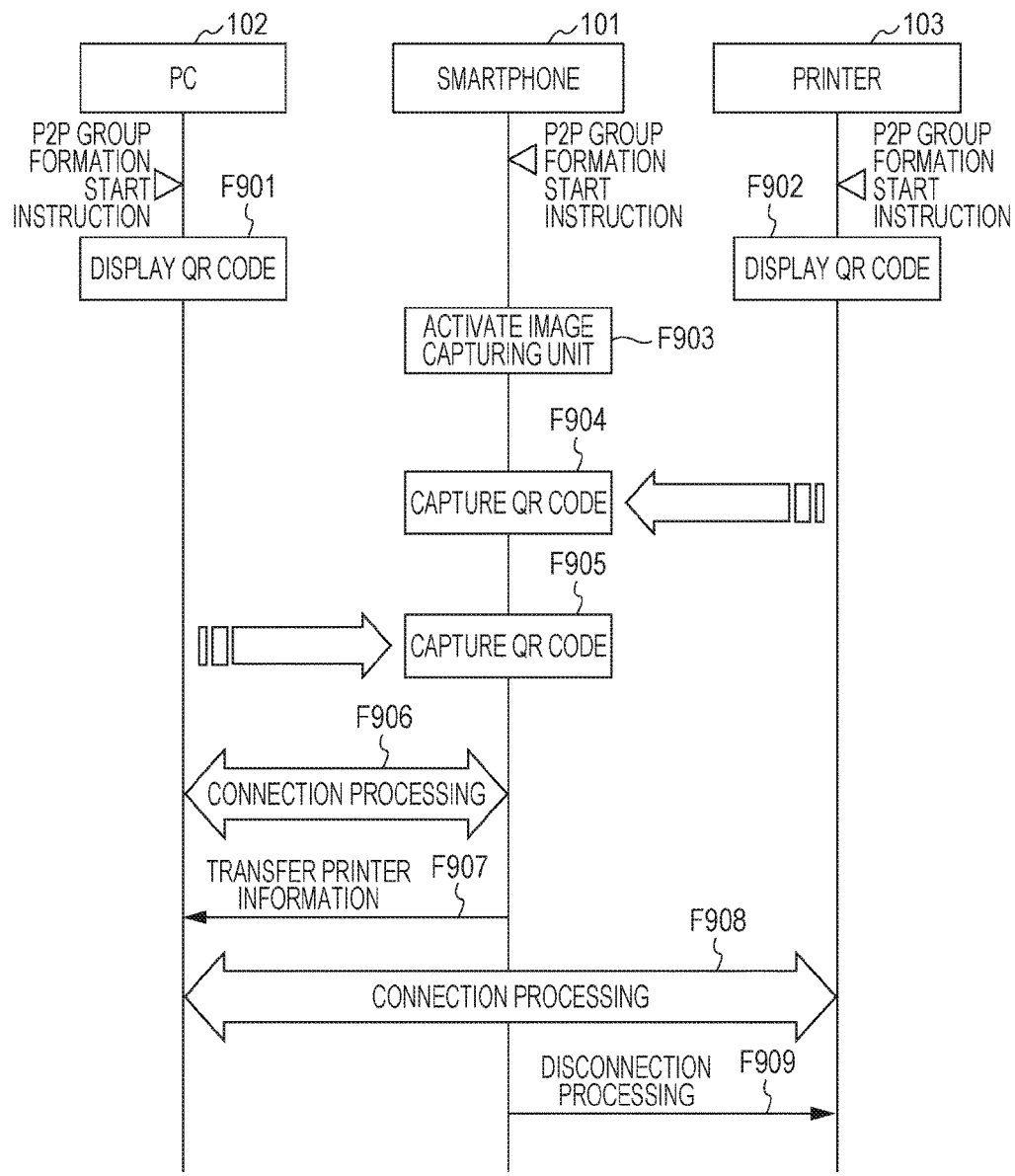

[Fig. 8]
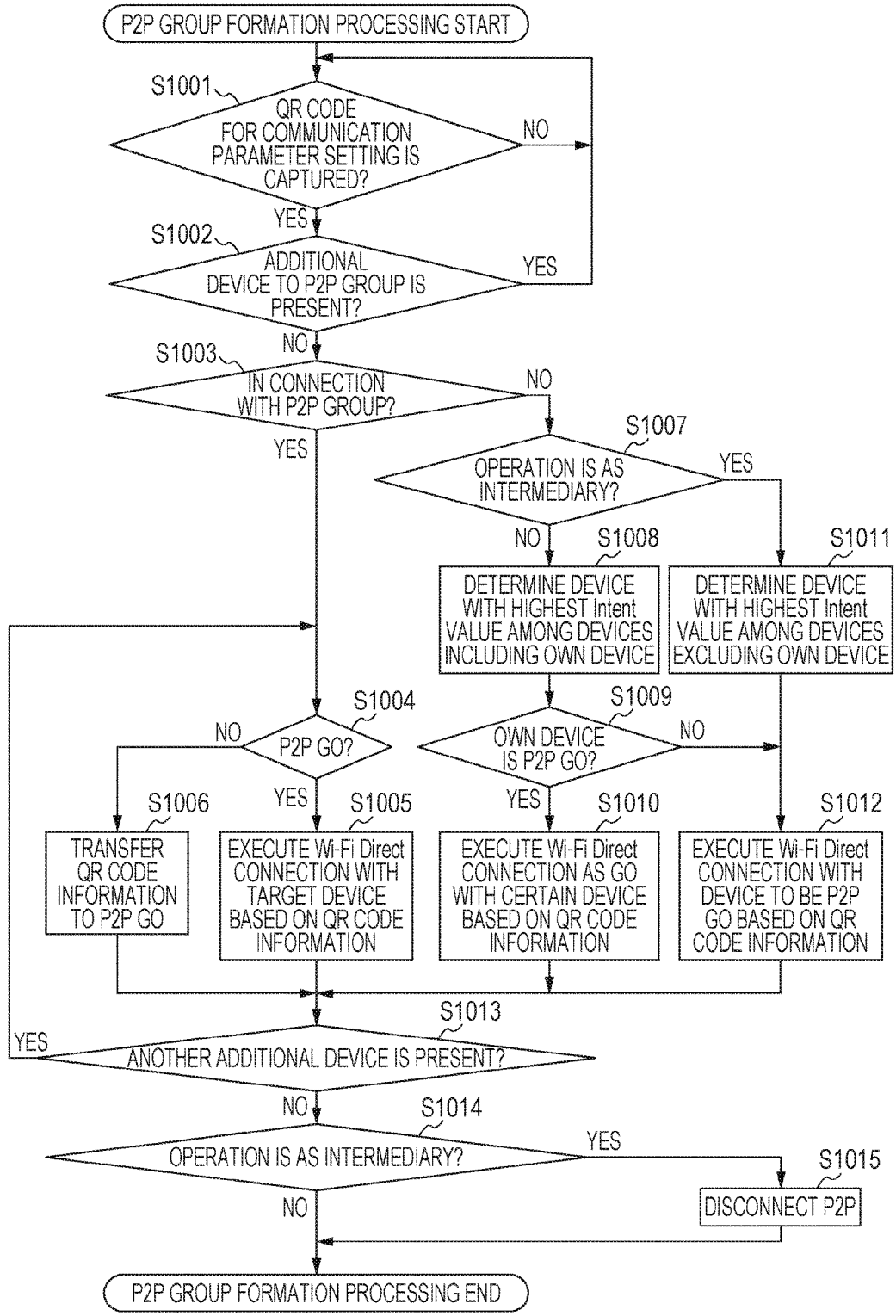

COMMUNICATION DEVICE, CONTROL METHOD OF COMMUNICATION DEVICE, AND STORAGE MEDIUM, FOR PERFORMING WIRELESS COMMUNICATION

TECHNICAL FIELD

The present invention relates to a communication technology.

BACKGROUND ART

In recent years, a case increases in which an electronic device, such as a digital camera, a printer, a cell phone, or a smartphone, has a wireless communication function and is connected to a wireless network for use. In particular, a case increases in which communication is made between devices by using a wireless local area network (LAN) as a wireless communication function.

To connect the electronic device to the wireless network, it is required to set at least one of various communication parameters, such as an encryption method, an encryption key, an authentication method, and an authentication key. As a technology to make setting of such a communication parameter easy, there is a technology disclosed in PTL 1.

In PTL 1, an electronic device displays a Quick Response code (QR code, registered trademark, this note will be omitted hereinafter) indicative of a communication parameter. A cell phone reads the QR code by capturing the image of the QR code, and sets the read communication parameter at an access point.

Also, there is a technology in which ability information and identification information on an electronic device are included in a QR code, and processing for determining a role whether to operate as a base station or to operate as a slave station is simplified in Wi-Fi Direct (registered trademark, this note will be omitted hereinafter) (see PTL 2).

As described in PTL 1 and PTL 2, by setting a communication parameter upon capturing of an image of code information such as a two-dimensional code that can code much information, troublesome input by a user can be reduced. If a communication parameter is set through three devices like PTL 1, the device that executes image capturing causes the other devices to connect with one another, and thereafter the own device may no longer need to communicate with the other devices. In this case, if the technology for determining the role whether the base station or the slave station of Wi-Fi Direct is used like PTL 2, a connection network may be unnecessarily constructed unless the role of the device being an intermediary that wirelessly connects the other devices with one another is properly defined.

For example, if a first device being an intermediary wirelessly connects a second device and a third device with one another, first, the first device is connected with the second device, and transmits information required for wireless connection between the second device and the third device, to the second device. In this case, if information on the third device is transmitted to the second device in a wireless network constructed by the first device serving as a base station, the first device is no longer required to communicate with the second device or the third device. Hence, since the first device does not make communication by itself, the first device is no longer required to keep the formed wireless network.

In this way, after the first device being the intermediary operates as the base station and transmits the information required for the wireless communication between the second and third devices to the second device, the first device is no longer required to keep the formed wireless network, and therefore the first device may possibly terminate the wireless network. When the first device being the intermediary terminates the wireless network, the second device or the third device is required to execute processing of newly forming a wireless network for communication between the second and third devices.

CITATION LIST

Patent Literature

PTL 1: Japanese Patent Laid-Open No. 2014-60623
PTL 2: U.S. Patent Application Publication No. 2014/0269646
PTL 3: Japanese Patent Laid-Open No. 2014-230152

SUMMARY OF INVENTION

Solution to Problem

To address the above-described problems, a communication device according to the present invention includes a base station control unit configured to operate as a base station that constructs a wireless network; a slave station control unit configured to operate as a slave station that connects with the wireless network constructed by the base station; an acquiring unit configured to acquire information used for sharing processing of sharing a communication parameter for wireless communication from a captured image; a first control unit configured to, if first another communication device and second another communication device are wirelessly connected with one another on the basis of the communication parameter shared in the sharing processing executed on the basis of the information acquired by the acquiring unit, control to connect with a wireless network by the slave station control unit, the wireless network being constructed by the second another communication device as the base station; and a communication unit configured to make communication for the sharing processing with the second another communication device on the basis of the information acquired by the acquiring unit in the wireless network with which the slave station control unit connects by the control by the first control unit.

Further features of the present invention will become apparent from the following description of exemplary embodiments with reference to the attached drawings.

BRIEF DESCRIPTION OF DRAWINGS

FIG. 1 is an illustration showing an example of a configuration of a communication system.
FIG. 2 is an illustration showing a configuration of a smartphone.
FIG. 3 is an illustration showing a configuration of each of a PC and a printer.
FIG. 4 is an illustration showing an example of an operation sequence of the communication system.
FIG. 5 is a flowchart showing an example of an operation of the smartphone.
FIG. 6 is a flowchart showing an example of an operation of the smartphone.
FIG. 7 is an illustration showing an example of an operation sequence of the communication system.

FIG. 8 is a flowchart, showing an example of an operation of the smartphone.

DESCRIPTION OF EMBODIMENTS

An embodiment described below can simplify processing of constructing a wireless network when a communication device wirelessly connects a plurality of other communication devices with one another.

FIG. 1 illustrates a configuration of a communication system according to this embodiment. In FIG. 1, reference sign 101 denotes a smartphone, and reference sign 102 denotes a personal computer (PC). Reference sign 103 denotes a printer, and reference sign 104 denotes a wireless network formed among devices of this communication system. In this embodiment, the wireless network 104 shown in FIG. 1 is a wireless LAN conforming to The Institute of Electrical and Electronics Engineers, Inc. (IEEE) 802.11 series. Also, the wireless network 104 is a wireless network configured by using Wi-Fi Direct. However, the communication form is not necessarily limited to the wireless LAN conforming to IEEE 802.11. Similarly, the wireless network is not limited to the network configured by using Wi-Fi Direct.

Now, Wi-Fi Direct is described. Wi-Fi Direct is a standard established by Wi-Fi Alliance. Wi-Fi Direct defines execution of wireless LAN communication such that a communication device retrieves a communication target and forms a communication group with the retrieved communication target.

In Wi-Fi Direct, a communication device that operates as a wireless LAN access point is called P2P group owner (hereinafter, referred to as GO), and a communication device that operates as a wireless LAN station is called P2P client (hereinafter, referred to as CL).

That is, in Wi-Fi Direct, GO operates as a base station, and CL operates as a slave station. These roles are determined by GO Negotiation protocol, and are defined by Wi-Fi Direct specification. The device that executes Wi-Fi Direct operates as determined one of the roles, and executes wireless connection and wireless communication with the communication target.

In Wi-Fi Direct, a network formed by GO is called P2P group. Also in this specification, a network may be occasionally described as P2P group. A network and a P2P group are described with the same meaning.

It is to be noted that, in this specification, a P2P group owner (GO), a P2P client (CL), and a group of communication devices with roles undetermined are collectively called P2P device. A P2P device can participate in a wireless network (CL function) and construct a wireless network (GO function).

Also, when connection is made between devices by using Wi-Fi Direct, Go provides a communication parameter to CL, and connection is made between the devices by using the communication parameter. The communication parameter includes various kinds of wireless communication parameters for wireless communication conforming to IEEE 802.11 standard. That is, the communication parameter includes wireless communication parameters required for executing wireless LAN communication, such as a service set identifier (SSID) as a network identifier, an encryption method, an encryption key, an authentication method, and an authentication key. Also, a media access control (MAC) address and an Internet protocol (IP) address for making communication in an IP layer may be included.

In this embodiment, the smartphone 101, the PC 102, and the printer 103 each have a function of Wi-Fi Direct. One of these devices operates as GO, and the devices other than GO operate as CL. Then, the device that operates as CL connects with GO, and hence the wireless network 104 being a P2P group is formed.

It is to be noted that GO can operate as an access point (AP) in an infrastructure mode defined in IEEE 802.11 standard. Also, GL can operate as a station (STA) in the infrastructure mode defined in IEEE 802.11 standard.

In the following description, a case is described in which processing of connecting the PC 102 with the printer 103 by Wi-Fi Direct is executed through the smartphone 101. Devices in the communication system according to this embodiment are described as a smartphone, a PC, and a printer. However, the devices may be other devices, for example, a camera, a video camera, a smart watch, or a personal digital assistant (PDA).

A hardware configuration of a device according to this embodiment is described with reference to FIG. 2. In FIG. 2, reference sign 101 denotes the entire smartphone. Reference sign 201 denotes an image capturing unit including a charge-coupled device (CCD), a lens, etc. The image capturing unit 201 captures an image and/or a movie. The image capturing unit 201 captures and reads code information including a one-dimensional code such as a barcode, and a two-dimensional code such as a QR code. Reference sign 202 denotes an image processing unit configured to execute image processing on an image or the like captured by the image capturing unit 201. Decoding processing and analysis processing on the code information such as the QR code (described later) are executed by the image processing unit 202. The image processing unit 202 analyzes the image captured by the image capturing unit 201, decodes coded information, and acquires the information.

Reference sign 203 denotes an operation unit configured to operate the smartphone 101. The operation unit 203 includes an operation button etc. The operation unit 203 stores a flag corresponding to an input in a memory such as a storage unit 207. Reference sign 204 denotes a display unit having a function of outputting at least one of visual information and sound information. If the display unit 204 displays visual information, the display unit 204 has a video RAM (VRAM) that holds image data corresponding to the visual information to be displayed. The display unit 204 executes display control that causes the LCD to continuously display image data stored in VRAM. Reference sign 205 denotes a power supply unit configured to supply power to each hardware of the smartphone 101. The power supply unit 205 is configured of, for example, a battery.

Reference sign 206 is a control unit configured to control the entire smartphone 101 by executing a control program stored in the storage unit 207. Respective operations (described later) are performed by the control unit 206 executing the control program stored in the storage unit 207. The control unit 206 is configured of, for example, a central processing unit (CPU). Reference sign 207 denotes the storage unit configured to store various pieces of information, such as the control program executed by the control unit 206 and information on a communication target device. The storage unit 207 is configured of, for example, a storage medium, such as a hard disk drive (HDD), a flash memory, a removable secure digital (SD) card, a read-only memory (ROM), or a random access memory (RAM).

Reference sign 208 is an antenna that can make communication in 2.4 GHz band and/or 5 GHz band for executing wireless LAN communication. Reference sign 209 denotes a communication unit configured to execute wireless LAN communication conforming to IEEE 802.11 series. The communication unit 209 also executes protocol processing conforming to Wi-Fi Direct. The communication unit 209 is configured of a chip that executes wireless communication.

Functions that are stored as programs in the storage unit 207 of the smartphone 101 and that are realized by the control unit 206 executing the programs are described. The functions described below are realized by the control unit 206 controlling each hardware, and arithmetically operating and processing information, according to the control program.

The smartphone 101 executes communication parameter automatic setting processing of sharing a communication parameter when Wi-Fi Direct connection is executed between devices. In the communication parameter automatic setting processing, a provider device provides a communication parameter for wireless communication to a receiver device. In this case, the communication parameter includes wireless communication parameters required for executing wireless LAN communication, such as a service set identifier (SSID) as a network identifier, an encryption method, an encryption key, an authentication method, and an authentication key. Also, a MAC address, a pass phrase, an IP address for communication in an IP layer, and information required for high-order service may be included.

The smartphone 101 can execute the communication parameter automatic setting processing in a plurality of methods. A first method executable by the smartphone 101 is a method of sharing a communication parameter between two devices including the smartphone 101 and another device.

In the first method, the smartphone 101 captures a QR code displayed on the other device or associated with the other device. Then, the smartphone 101 acquires information required for setting a communication parameter included in the read QR code. The information required for setting the communication parameter is, for example, the communication parameter itself, identification information on the device, identification information on the communication parameter automatic setting processing, etc. Also, information relating to Wi-Fi Direct may be included. An example may be an Intent value used in negotiation processing for determining GO between the devices.

Then, the smartphone 101 acquires the identification information on the device included in the read QR code. The identification information on the device may be a MAC address or a universally unique identifier (UUID) that uniquely identifies the device. The smartphone 101 transmits a signal for designating the device indicated by the identification information acquired from the QR code, and retrieves the device indicated by the identification information acquired from the QR code. When the smartphone 101 detects the device indicated by the identification information acquired from the QR code, the smartphone 101 shares an encrypted communication parameter between the devices by wireless communication. The smartphone 101 wirelessly connects with the device indicated by the identification information acquired from the QR code on the basis of the shared communication parameter. In the communication parameter automatic setting processing, a communication parameter encrypted by using a public key may be transmitted/received between the devices. This public key may be included in the QR code. A method of encrypting a communication parameter by using a public key may use, for example, a method described in PTL 3.

Also, a second method executable by the smartphone 101 is a method of sharing a communication parameter among a plurality of other devices through the smartphone 101. In the second method, the smartphone 101 executes processing for wirelessly connecting a first device and a second device with one another by using Wi-Fi Direct. In this case, the first device is a device that newly participates in a wireless network of the P2P group. The first device operates as a receiver device that receives a communication parameter in the communication parameter automatic setting processing. Also, the first device may be CL.

Also, the second device is a device operable as a provider device that provides a communication parameter in the communication parameter automatic setting processing. Also, the second device may be GO that constructs the wireless network of the P2P group.

In the second method, the smartphone 101 captures a QR code displayed on the first device or associated with the first device. It is to be noted that the QR code associated with the first device is a QR code attached to a casing of the first device or a QR code written in an operation manual of the first device.

Then, the smartphone 101 acquires identification information on the first device included in the read QR code. The smartphone 101 is a device that can make connection in accordance with previous setting etc. in the first method. The smartphone 101 transfers identification information on the first device included in the read QR code to the second device that can establish a secure link, through the secure link. The smartphone 101 transmits the identification information on the first device included in the QR code, as information on a device that requests wireless connection, to the second device. The second device which has received the transferred identification information on the first device included in the QR code from the smartphone 101 retrieves the device indicated by the identification information through wireless communication. If the second device detects the device indicated by the identification information, the second device transmits a communication parameter to the first device.

The first device wirelessly connects with the second device by Wi-Fi Direct on the basis of the received communication parameter. The second device may transmit the communication parameter in an encrypted state by public-key cryptosystem, to the first device. Alternatively, the notification about the identification information from the smartphone 101 to the second device may be executed by using a secure link using a wireless LAN. Still alternatively, the notification about the identification information from the smartphone 101 to the second device may be executed by using the wireless network of the P2P group. Yet alternatively, the notification about the identification information from the smartphone 101 to the second device may be executed by using near wireless communication, such as near field communication (NFC). Yet alternatively, this transfer may use communication other than the wireless LAN communication, for example, Bluetooth (registered trademark, this note will be omitted hereinafter). Yet alternatively, the smartphone 101 may execute transfer by causing a display unit of the own device to display information read from the acquired QR code as the QR code, and by causing the second device to read the QR code.

When the smartphone 101 executes the setting by the second method, the smartphone 101 can previously register the second device. The device to be registered as the second device may be a device that shared the communication parameter by the first method. Also, the device to be registered as the second device may be a device that can be connected through a secure link. Also, the device to be registered as the second device may be a device that formed a P2P group.

Also, the smartphone 101 can execute wireless communication conforming to Wi-Fi Direct in communication by the communication unit 209, and can operate as GO and CL. Also, the smartphone 101 may operate as an access point defined by IEEE 802.11. Also, the smartphone 101 may operate as a station defined by IEEE 802.11 in communication by the communication unit 209. Also, the smartphone 101 can execute Wi-Fi Protected Setup (WPS) established by Wi-Fi Alliance in communication by the communication unit 209.

Next, a configuration of each of the PC 102 and the printer 103 is described with reference to FIG. 3. In FIG. 3, reference sign 301 denotes an operation unit configured to operate the PC 102 or the printer 103 and including an operation button or the like. The operation unit 301 stores a flag corresponding to an input in a memory such as a storage unit 305. Reference sign 302 denotes a display unit having a function of outputting at least one of visual information and sound information. If the display unit 302 displays visual information, the display unit 302 has VRAM that holds image data corresponding to the visual information to be displayed. The display unit 302 executes display control that causes the LCD to continuously display image data stored in VRAM. Reference sign 303 denotes a power supply unit configured to supply power to each hardware of the PC 102. The power supply unit 303 is configured of, for example, a battery.

Reference sign 304 is a control unit configured to control the entire PC 102 by executing a control program stored in the storage unit 305. Respective operations (described later) are performed by the control unit 304 executing the control program stored in the storage unit 305. The control unit 304 is configured of, for example, a CPU. Reference sign 305 denotes the storage unit configured to store various pieces of information, such as the control program executed by the control unit 304 and information on a communication target device. The storage unit 305 is configured of, for example, a storage medium, such as an HDD, a flash memory, a SD card, a ROM, or a RAM.

Reference sign 306 is an antenna that can make communication in 2.4 GHz band and/or 5 GHz band for executing wireless LAN communication. Reference sign 307 denotes a communication unit configured to execute wireless LAN communication conforming to IEEE 802.11 series. The communication unit 307 also executes protocol processing conforming to Wi-Fi Direct. The communication unit 307 is configured of a chip that executes wireless communication. Reference sign 308 denotes a function unit being hardware for executing predetermined processing. The function unit 308 of the PC 102 is, for example, an image capturing unit, and executes image capturing processing. Also, the function unit 308 of the printer 103 is a print unit, and executes print processing.

Next, functions that are stored as programs in the storage unit 305 of the PC 102 or the printer 103 and that are realized by the control unit 304 executing the programs are described. The functions described below are realized by the control unit 304 controlling each hardware, and arithmetically operating and processing information, according to the control program.

The PC 102 or the printer 103 can execute communication parameter automatic setting processing of sharing a communication parameter between devices. Also, the PC 102 or the printer 103 can execute wireless communication conforming to Wi-Fi Direct in communication by the communication unit 307, and can operate as GO and CL. Also, the PC 102 or the printer 103 may operate as an access point defined by IEEE 802.11. Also, the PC 102 or the printer 103 may operate as a station defined by IEEE 802.11 in communication by the communication unit 307. Also, the PC 102 or the printer 103 can execute WPS established by Wi-Fi Alliance.

Also, the PC 102 or the printer 103 generates a QR code including information required for setting a communication parameter. The generated QR code is displayed by the display unit 302 using the LCD or the like. The information required for setting the communication parameter is, for example, identification information on the device, the communication parameter itself, identification information on the communication parameter automatic setting processing, etc. Also, information relating to Wi-Fi Direct may be included. An example of the information relating to Wi-Fi Direct may be an Intent value used in negotiation processing for determining GO between devices. Regarding the QR code, a previously generated QR code may be attached to a casing, or a QR code may be written in an operation manual. Also, the PC 102 or the printer 103 can operate as a device that displays a QR code in the above-described first method. Also, the PC 102 or the printer 103 can operate as the first device or the second device described in the above-described second method.

Next, an operation of a communication system having the above-described configuration is described. Described here is a case in which the wireless network 104 being a P2P group is formed by using the smartphone 101 to make communication by Wi-Fi Direct between the PC 102 and the printer 103.

A sequence chart in the communication system is described with reference to FIG. 4. In the sequence chart shown in FIG. 4, a case is described in which the wireless network 104 is formed among the smartphone 101, the PC 102, and the printer 103. In FIG. 4, the smartphone 101 captures a QR code of the printer 103 first, executes connection processing by Wi-Fi Direct with respect to the printer 103, and forms the wireless network 104. Then, the smartphone 101 captures a QR code of the PC 102, and causes the PC 102 to be connected with the wireless network 104 by Wi-Fi Direct. Also, in FIG. 4, a case is described in which the printer 103 operates as GO in the wireless network 104.

First, the smartphone 101, the PC 102, and the printer 103 each receive an instruction about start of P2P group formation from a user. After the PC 102 and the printer 103 each receive the instruction about start of P2P group formation, the PC 102 and the printer 103 each display the QR code on the display unit 302 (F501, F502). The displayed QR code includes encoded information required for the communication parameter automatic setting processing in Wi-Fi Direct connection.

When the smartphone 101 receives the instruction about the start of P2P group formation, the smartphone 101 activates the image capturing unit 201. The smartphone 101 activates the image capturing unit 201 and captures the QR code displayed on the display unit 302 of the printer 103 (F503, F504). A case is described in which the QR code of the printer 103 is captured first. However, the QR code of the PC 102 may be captured first. In this case, the processing of the printer 103 and the processing of the PC 102 are replaced with one another.

After image capturing, the smartphone 101 executes processing shown in FIG. 6 (described later), and executes connection processing by Wi-Fi Direct with respect to the printer 103 on the basis of information included in the QR code (F505). Connection processing is described now. The smartphone 101 and the printer 103 each start Find Phase defined by Wi-Fi Direct for retrieving one another. The smartphone 101 starts Find Phase in response to image capturing of the QR code or an instruction by a user. Alternatively, the printer 103 starts Find Phase in response to displaying of the QR code or an instruction by the user.

In Find Phase, first, all channels are scanned by using a retrieval signal added with an information element indicating availability of Wi-Fi Direct. Then, if a desirable communication target cannot be detected by all channel scanning, processing of scanning 1, 6, and 11 ch by using the retrieval signal, and processing of waiting for the retrieval signal from a communication target through any one of 1, 6, and 11 ch are alternately executed. The retrieval signal transmitted by the smartphone 101 may include information that designates the identifier of the printer 103 being information included in the QR code. The smartphone 101 and the printer 103 may transmit a retrieval signal added with an information element indicative of conformance to the communication parameter automatic setting processing using image capturing of the QR code.

If the smartphone 101 and the printer 103 detect one another, the smartphone 101 and the printer 103 execute negotiation processing for determining the role whether GO or CL. In FIG. 4, it is assumed that the printer 103 is determined to operate as GO in the negotiation processing for GO. The smartphone 101 receives a communication parameter from the printer 103 and connects with the printer 103 on the basis of the communication parameter.

After the connection with the printer 103, the smartphone 101 captures the QR code displayed on the display unit 302 of the PC 102 (F506). After image capturing, the smartphone 101 executes processing shown in FIG. 6, executes the setting processing in the second method, and transmits an identifier included in the captured QR code to the printer 103 operating as GO (F507).

The printer 103 executes connection processing by Wi-Fi Direct with respect to the PC 102 by using the received identifier. It is to be noted that the PC 102 starts Find Phase in response to that the QR code is displayed on the display unit 302, or an instruction by the user. The retrieval signal transmitted from the PC 102 may include an information element indicative of conformance to the communication parameter automatic setting processing using image capturing of the QR code.

Then, the PC 102 retrieves another device to which the content of the QR code displayed on the display unit 302 is transmitted. It is assumed that the printer 103 adds the received identifier to a beacon and a response signal to the retrieval signal. The printer 103 may execute Invitation processing of Wi-Fi Direct on the basis of the acquired identifier of the PC 102. By executing Invitation processing, the PC 102 may participate in the wireless network 104 formed by the printer 103.

The communication parameter that is transmitted in the connection processing of Wi-Fi Direct may be encrypted by public-key cryptosystem using a public key and transmitted. This method may use, for example, a method described in PTL 3. Alternatively, for example, a public key may be acquired by capturing a QR code.

By executing the connection processing by Wi-Fi Direct with respect to the printer 103, the PC 102 serves as CL, receives the communication parameter from the printer 103, and is connected with the wireless network 104 (F508). After the PC 102 completes connection by Wi-Fi Direct with the printer 103, by executing processing for using a print service of the printer 103, the PC 102 can cause the printer 103 to execute printing.

FIG. 5 is a flowchart when the smartphone 101 executes P2P group formation processing by Wi-Fi Direct, in which the own device also participates. The flowchart in FIG. 5 is started after start of P2P group formation by Wi-Fi Direct is instructed by the user through the operation unit 203. It is assumed that the smartphone 101 has received an instruction whether to execute group formation between two devices or to execute group formation among three or more devices, by the instruction for the start of P2P group formation. That is, the smartphone 101 selects to form a group between two devices of the smartphone 101 and another device, or to form a group among the smartphone 101 and a plurality of other devices.

Also, the flowchart shown in FIG. 5 shows a flow of processing performed by the control unit 206 reading a computer program stored in the storage unit 207 and executing the computer program. Alternatively, a portion or the entirety of steps in the flowchart shown in FIG. 5 may be realized by hardware such as application specific integrated circuit (ASIC).

In FIG. 5, when the smartphone 101 causes the image capturing unit 201 to capture a QR code in S601, the smartphone 101 decodes the captured QR code. Then, if the content of the captured QR code is information required for setting a communication parameter by Wi-Fi Direct, the smartphone 101 advances the processing to S602. If the captured QR code does not include the information required for setting the communication parameter by Wi-Fi Direct, the smartphone 101 may terminate the processing in error.

In S602, the smartphone 101 causes the communication unit 209 to judge whether or not the smartphone 101 is in connection with a P2P group. In S602, if the smartphone 101 is not in connection with the P2P group, the smartphone 101 advances the processing to S606, and if the smartphone 101 is in connection with the P2P group, the smartphone 101 advances the processing to S603. In S606, the smartphone 101 executes the connection processing by Wi-Fi Direct by using information included in the captured QR code. The information included in the captured QR code is, for example, an identifier of a device. The smartphone 101 retrieves the device indicated by the identifier. If the smartphone 101 finds the device indicated by the identifier through the retrieval, the smartphone 101 executes the connection processing by Wi-Fi Direct. The retrieval for the device indicated by the identifier may be executed by Probe Request and Probe Response being a response to the Probe Request defined in IEEE 802.11 standard.

In the processing in S606, Intent values are exchanged between devices, a device with a larger Intent value becomes GO and forms a wireless network. Also, a device with a smaller Intent value becomes CL, and participates in the wireless network formed by GO.

Communication parameter automatic setting processing to be executed in the connection processing of Wi-Fi Direct executed in S606 is communication parameter automatic setting processing using the first method. That is, the communication parameter automatic setting processing is executed between the smartphone 101 and the device which has captured the QR code.

If the connection processing by Wi-Fi Direct is completed in S606, the smartphone 101 judges whether or not still another device is allowed to participate in the P2P group in S607. The number of devices forming a group is instructed by the user through the instruction about the start of P2P group formation as described above. However, an inquiry for the number of devices may be made to the user after the P2P group formation processing in S606 is ended. In this case, the smartphone 101 may cause the display unit 204 to display confirmation to the user whether or not there is another device to be added to the P2P group. Alternatively, in the state in which the P2P group is formed, it may be judged that there is another device to participate in the group if the image capturing unit 201 of the smartphone 101 captures a QR code of the device.

In S607, if the smartphone 101 judges that there is no device to participate in the group, the smartphone 101 terminates the processing. If the smartphone 101 judges that there is another device to participate in the group, the smartphone 101 executes the processing from S601 again.

If still another device participates in the group, in the judgment in S602, the smartphone 101 is judged to be in connection with the P2P group, and the smartphone 101 advances the processing to S603. In S603, the smartphone 101 judges whether to operate as GO or not. If the smartphone 101 operates as GO, the processing goes to S604. If the smartphone 101 does not operate as GO, that is, if the smartphone 101 participates as CL in the P2P group, the processing goes to S605.

In S605, the smartphone 101 transfers the information acquired when capturing the QR code, to GO. The information acquired when the QR code is captured is, for example, an identifier of a device that displays the QR code. The processing in S605 is processing in the above-described second method. That is, The connection processing of Wi-Fi Direct is executed between another device being GO and the device indicated by the identifier included in the QR code in accordance with transfer of information acquired when the QR code is captured. In this case, GO may execute Invitation processing of Wi-Fi Direct on the device indicated by the identifier included in the QR code, and the device indicated by the identifier included in the QR code may participate in the P2P group. When the processing in S605 is terminated, the smartphone 101 makes judgment in S607.

In S604, the smartphone 101 executes the connection processing by Wi-Fi Direct with respect to the device indicated by the identifier included in the QR code by using the information included in the captured QR code. In this case, since the smartphone 101 is GO, the smartphone 101 provides the communication parameter for connection with the formed wireless network 104 to a device indicated by an identifier included in the QR code. After the connection processing by Wi-Fi Direct in S604 is terminated, judgment in S607 is executed.

As described above, with this embodiment, when the smartphone 101 reads the QR code, the smartphone 101 executes the connection processing of Wi-Fi Direct with the device indicated by the QR code, and the P2P group can be formed.

Described next is a case in which the smartphone 101 forms a P2P group among a plurality of other devices and the smartphone 101 does not participate in the P2P group. That is, the smartphone 101 participates only in the P2P group formation processing among the plurality of other devices, and after the P2P group is formed, the smartphone 101 operates as an intermediary from the P2P group. The configurations of the respective devices are similar to those described above.

FIG. 6 shows a flowchart of an operation when the smartphone 101 executes the P2P group formation processing by Wi-Fi Direct in a case in which the smartphone 101 operates as an intermediary. The flowchart in FIG. 6 is started after start of P2P group formation by Wi-Fi Direct is instructed by the user through the operation unit 203. It is assumed that the smartphone 101 has received an instruction whether to participate in the P2P group formed also by the own device at the instruction about the start of P2P group formation. That is, the smartphone 101 judges whether to operate as an intermediary or not in accordance with the instruction by the user.

Also, the flowchart shown in FIG. 6 shows a flow of processing performed by the control unit 206 reading a computer program stored in the storage unit 207 and executing the computer program. Alternatively, a portion or the entirety of steps in the flowchart shown in FIG. 6 may be realized by hardware such as application specific integrated circuit (ASIC).

In FIG. 6, when the smartphone 101 causes the image capturing unit 201 to capture a QR code in S801, the smartphone 101 decodes the captured QR code. Then, if the content of the captured QR code is information required for setting a communication parameter by Wi-Fi Direct, the smartphone 101 advances the processing to S802. If the captured QR code does not include the information required for setting the communication parameter by Wi-Fi Direct, the smartphone 101 may terminate the processing in error.

In S802, the smartphone 101 judges whether or not the smartphone 101 is in connection with a P2P group. In S802, if the smartphone 101 is not in connection with the P2P group, the smartphone 101 advances the processing to S805, and if the smartphone 101 is in connection with the P2P group, the smartphone 101 advances the processing to S803.

If the smartphone 101 is not in connection with the P2P group, the smartphone 101 judges whether to operate as an intermediary or not in S805. If the smartphone 101 operates as the intermediary, the smartphone 101 advances the processing to S807. If the smartphone 101 also keeps participating in the P2P group as a member of the P2P group, the processing goes to S806.

The judgment in S805 is made on the basis of the received instruction by the user at the instruction about the start of P2P group formation. Alternatively, an inquiry may be made to the user whether the smartphone 101 operates as an intermediary or not if the QR code is captured. This inquiry is made by confirming the user whether the smartphone 101 operates as an intermediary or not through the display unit 204 of the smartphone 101 and by receiving the instruction by the user with the operation unit 203.

If it is judged that the smartphone 101 operates as the intermediary, the smartphone 101 determines to become CL in the P2P group formation processing with respect to the device indicated by the identification information included in the QR code in S807. If the smartphone 101 operates as the intermediary, when the formation of the P2P group is completed among the plurality of other devices (for example, between the PC 102 and the printer 103), the smartphone 101 separates from the P2P group. Owing to this, if the smartphone 101 operates as GO, the smartphone 101 terminates the wireless network constructed by the smartphone 101 as GO. Another P2P group is required to be formed between the printer 103 and the PC 102 again. Hence, the wasted P2P group is formed. In this embodiment, to reduce the processing of constructing the wireless network, if the smartphone 101 operates as the intermediary, the smartphone 101 determines to operate as CL.

If the smartphone 101 determines to operate as CL, the smartphone 101 executes the connection processing by Wi-Fi Direct with respect to the device indicated by the identification information included in the QR code on the basis of the information acquired by capturing the QR code in S808.

In S808, the smartphone 101 executes role determination processing by GO Negotiation protocol in Wi-Fi Direct so that the smartphone 101 operates as CL. GO Negotiation defines that the Intent values are exchanged between devices, a device with a larger value becomes GO, and a device with a smaller value becomes CL. Hence, the Intent value of the smartphone 101 is set at the minimum value so that the smartphone 101 operates as CL. Wi-Fi Direct defines that the Intent value is in a range from 0 to 15. Hence, in this case, the smartphone 101 sets the Intent value at 0 with respect to the device indicated by the identification information included in the QR code, and executes negotiation for determining the role. If the Intent value of the target device is previously figured out, such as in a case in which the information acquired from the QR code includes information indicative of the Intent value, the smartphone 101 may set a value smaller than the previously figured out value as the Intent value, and execute negotiation.

If the Intent value of the target device is also at 0 being the minimum value, the smartphone 101 may terminate the processing in error once, and may execute negotiation for determining the role again. Also, in Wi-Fi Direct, to prepare for a case in which devices have the same Intent value, a message for exchanging the Intent value includes a randomly generated bit called Tie breaker bit. The device that transmits the Intent value later establishes a bit inverted to Tie breaker hit in the message including the Intent value received from the target device. For example, if received Tie breaker bit in the message for exchanging the Intent value is "1," the device that transmits the Intent value later sets Tie breaker bit at "0" and transmits the Intent value. Also, if received Tie breaker hit in the message for exchanging the Intent value is "0," the device that transmits the Intent value later sets Tie breaker bit at "1" and transmits the Intent value.

Wi-Fi Direct defines that, in the case in which the devices have the same Intent value, the device with Tie breaker bit having the value of "1" operates as GO. Hence, the smartphone 101 may set Tie breaker bit at "0" and transmit the Intent value before the target device does to prepare for the case in which the target device also has the Intent value of 0 being the minimum value. Also, if the Intent value of the target device is 0 being the minimum vale and the smartphone 101 determines to operate as GO with regard to Tie breaker bit, the smartphone 101 may terminate the processing in error once, and may execute negotiation for determining the role again.

In this way, if the smartphone 101 operates as the intermediary, the smartphone 101 provides control not to become GO.

The smartphone 101 executes negotiation so that the smartphone 101 operates as CL, and executes the connection processing by Wi-Fi Direct with respect to the device indicated by the identifier included in the QR code. In this case, since the smartphone 101 is CL, the smartphone 101 receives the communication parameter for connection with the wireless network 104 constructed by the other device from the device indicated by the identifier included in the QR code.

Then, the smartphone 101 executes the processing from S801 again to capture the other device forming the P2P group.

In contrast, if it is judged that the smartphone 101 does not operate as the intermediary in S805, the smartphone 101 determines to become GO in the P2P group formation processing with respect to the device indicated by the identification information included in the QR code in S807. That is, if the smartphone 101 also keeps to participate in the P2P group, the smartphone 101 determines to become GO. Accordingly, if the smartphone 101 further allows still another device to participate in the P2P group, processing of transferring information relating to still another device included in the QR code to GO, the processing which corresponds to F507 in FIG. 5, can be omitted. That is, since the smartphone 101 becomes GO, if still another device participates in the P2P group, a direct communication parameter or the like can be shared between the smartphone 101 and still another device.

If the smartphone 101 determines to operate as GO, the smartphone 101 executes the connection processing by Wi-Fi Direct with respect to the device indicated by the identification information included in the QR code on the basis of the information acquired by capturing the QR code in S812.

In S812, the smartphone 101 executes role determination processing by GO Negotiation protocol in Wi-Fi Direct so that the smartphone 101 operates as GO. In this case, the smartphone 101 sets the Intent value at 15 being the maximum value to operate as GO, and then executes negotiation for determining the role. If the Intent value of the target device is previously figured out, such as in a case in which the information acquired from the QR code includes information indicative of the Intent value, the smartphone 101 may set a value larger than the previously figured out value as the Intent value, and execute negotiation. If the smartphone 101 determines to operate as GO, the smartphone 101 may start operating as GO without executing negotiation for determining the role with the target device. That is, the smartphone 101 may form the wireless network 104 while operating as GO, and then may execute the connection processing of Wi-Fi Direct with the target device. With this configuration, the smartphone 101 can operate as GO surely.

The smartphone 101 executes negotiation so that the smartphone 101 operates as GO, and executes the connection processing by Wi-Fi Direct with respect to the device indicated by the identifier included in the QR code. In this case, since the smartphone 101 is GO, the smartphone 101 provides the communication parameter for connection with the wireless network 104 formed by the own device to a device indicated by an identifier included in the QR code, and forms the P2P group between the devices.

In contrast, in S802, if it is judged that the smartphone 101 is in connection with the P2P group, the smartphone 101 judges whether to be in operation as GO in the connected P2P group (S803). If the smartphone 101 is in operation as GO, the smartphone 101 advances the processing to S809. If the smartphone 101 does not operate as GO, that is, if the smartphone 101 participates as CL in the P2P group, the smartphone 101 advances the processing to S804.

In S804, the smartphone 101 executes the connection processing by Wi-Fi Direct with respect to the device indicated by the identifier included in the QR code by using the information included in the captured QR code. In this case, since the smartphone 101 is GO, the smartphone 101 provides the communication parameter for connection with the formed wireless network 104 to the device indicated by the identifier included in the QR code, and forms the P2P group.

If it is judged that the smartphone 101 does not operate as GO in S803, the smartphone 101 transfers the information acquired when the smartphone 101 captures the QR code to GO in S809. The information acquired when the smartphone 101 captures the QR code is, for example, an identifier of a device that displays the QR code. The processing in S809 is processing in the above-described second method. That is, the connection processing of Wi-Fi Direct is executed between the other device being GO and the device indicated by the identifier included in the QR code. In this case, GO may execute Invitation processing of Wi-Fi Direct on the device indicated by the identifier included in the QR code, and the device indicated by the identifier included in the QR code may participate in the P2P group. When the processing in S809 is terminated, the smartphone 101 makes judgment in S810.

In S810, the smartphone 101 judges whether to operate as an intermediary or not. If the smartphone 101 operates as the intermediary, the processing goes to S811. If the smartphone 101 does not operate as the intermediary, and keeps to participate as a member of the P2P group, the P2P group formation processing is terminated. In S810, if there is another device to be added to the P2P group while the smartphone 101 operates as the intermediary, the smartphone 101 may execute the processing from S801 again. For example, the smartphone 101 may cause the display unit 204 to display to the user whether or not there is another device to be added to the P2P group, to confirm about the device to the user. If there is another device to be added to the P2P group, the processing does not go to S811, keeps connection with the P2P group, and executes the processing from S801 again.

In S811, the smartphone 101 separates from the P2P group, and executes processing of disconnecting the wireless connection. Disconnection processing judges whether or not the P2P group formation is completed between desirable devices, and if it is judged that the formation is completed, the disconnection processing may be executed. For example, on the basis of the identifier information on the PC 102 and the printer 103 acquired from the QR code, the smartphone 101 may confirm whether or not each device can make communication in the P2P group. This confirmation may be made by executing Ping or the like using Internet Control Message Protocol (ICMP) message and judging whether or not communication in an IP layer is established.

As described above, with this embodiment, since the device being GO is determined in accordance with whether or not the smartphone 101 operates as the intermediary, a different device can be prevented from creating a wireless network.

Described above is the case in which the Wi-Fi Direct connection sequence is sequentially executed for each device after the QR codes of the devices that participate in the P2P are captured. Described next is a case in which a Wi-Fi Direct connection sequence is executed after QR codes of a plurality of devices that participate in a P2P group are captured. The configurations of the respective devices are similar to those described above.

FIG. 7 shows a sequence chart in which the smartphone 101 connects the PC 102 and the printer 103 by Wi-Fi Direct. Also in FIG. 7, a case in which the smartphone 101 operates as an intermediary is described.

In FIG. 7, the smartphone 101, the PC 102, and the printer 103 each receive an instruction about start of P2P group formation from a user. The PC 102 and the printer 103 each display a QR code on each display unit 302 (F901, F902). The displayed QR codes include encoded information required for the communication parameter automatic setting processing using Wi-Fi Direct. In this embodiment, it is assumed that the QR code includes the Intent value.

Then, the smartphone 101 activates the image capturing unit 201 (F903), and continuously captures the QR codes of the printer 103 and the PC 102 (F904, F905).

After image capturing, the smartphone 101 executes processing shown in FIG. 8 (described later), and determines a device to be GO on the basis of information included in the QR codes. In FIG. 7, a case is described in which the PC 102 is determined as a device to be GO.

The smartphone 101 first executes the connection processing by Wi-Fi Direct with the PC 102 to be GO (F906). The smartphone 101 executes the setting processing in the second method on the printer 103, and transmits an identifier included in the captured QR code to the PC 102 operating as GO (F907).

The PC 102 executes the connection processing by Wi-Fi Direct with respect to the printer 103 by using the received identifier. The printer 103 serving as CL is connected to the wireless network 104 after the execution of the connection processing by Wi-Fi Direct with respect to the PC 102 (F908). If the connection by Wi-Fi Direct is completed between the PC 102 and the printer 103, the smartphone 101 executes disconnection processing from the wireless network 104 (F909).

After the PC 102 completes connection by Wi-Fi Direct with the printer 103, by executing processing for using a print service of the printer 103, the PC 102 can cause the printer 103 to execute printing.

FIG. 8 is a flowchart of P2P group formation processing according to this embodiment executed by the smartphone 101. The flowchart in FIG. 8 is started after the start of P2P group formation by Wi-Fi Direct is instructed by the user through the operation unit 203.

Also, the flowchart shown in FIG. 8 shows a flow of processing performed by the control unit 206 reading a computer program stored in the storage unit 207 and executing the computer program. Alternatively, a portion or the entirety of steps in the flowchart shown in FIG. 8 may be realized by hardware such as application specific integrated circuit (ASIC).

In S1001, when the smartphone 101 causes the image capturing unit 201 to capture a QR code, the smartphone 101 decodes the captured QR code. Then, if the content of the captured QR code is information required for setting a communication parameter by Wi-Fi Direct, the smartphone 101 advances the processing to S1002. If the captured QR code does not include the information required for setting the communication parameter by Wi-Fi Direct, the smartphone 101 may terminate the processing in error. The smartphone according to this embodiment repetitively execute the processing in S1001 until the smartphone captures QR codes of all devices to participate in the P2P group.

In S1002, the smartphone 101 judges whether or not the QR codes of all devices to participate in the P2P group are captured. If image capturing for all devices is completed and there is no device to be added, the smartphone 101 advances the processing to S1003. The judgment in S1002 is made by causing the display unit 204 to display a message of making an inquiry whether or not the QR codes of all devices have been captured, and judging whether or not the operation unit 203 receives an operation indicative of that the QR codes of all devices have been captured. Alternatively, for example, a predetermined period (for example, within two minutes) may be measured, and if the predetermined time has elapsed, it may be judged that the QR codes of all devices to participate in the P2P group have been captured.

S1003, S1004, S1005, S1006, and S1007 are processing respectively equivalent to S802, S803, S804, S809, and S805. Therefore, the description is omitted here.

In S1007, if the smartphone 101 does not operate as the intermediary, that is, if the smartphone 101 also participates as a member of the P2P group, the smartphone 101 advances the processing to S1008. If the smartphone 101 operates as the intermediary, the smartphone 101 advances the processing to S1011.

In S1008, the smartphone 101 determines that a device with the largest Intent value among the Intent values acquired from the QR codes displayed on the PC 102 and the printer 103 and the Intent value of the smartphone 101 is a device to be GO. Alternatively, in S1008, the smartphone 101 may determine to operate as GO similarly to aforementioned S806. After the device to be GO is determined, the processing goes to S1009.

In S1009, the smartphone 101 judges whether or not the own device is determined as GO. If the smartphone 101 is determined as GO, the processing goes to S1010. If the smartphone 101 is not GO, the processing goes to S1012.

In S1010, since the smartphone 101 operates as GO, the smartphone 101 may execute the connection processing of Wi-Fi Direct with a desirable device first. For example, the order of executing the connection processing may be the order of capturing the QR codes. However, the order is not limited thereto. After the connection processing by Wi-Fi Direct with a desirable device is completed, the processing goes to S1013.

In S1011, the Intent values are compared with one another among the devices the QR codes of which have been captured by the smartphone 101. The smartphone 101 references the comparison result of the Intent values, selects the device with the highest intent value, and determines a device to be GO. Since the smartphone 101 operates as the intermediary and separates from the formed P2P group, the smartphone 101 determines a device which is other than the smartphone 101 and has the highest Intent value as a device to be GO. After the device to be GO is determined, the processing goes to S1012.

In S1012, the smartphone 101 executes the connection processing of Wi-Fi Direct with respect to the device to be GO first. After the connection processing by Wi-Fi Direct with the device to be GO is completed, the processing goes to S1013. In FIG. 7, it is assumed that the PC 102 is selected as the device to be GO by this processing.

In S1013, it is judged whether there is another device to be added to the P2P group or not. If there is another device to be added to the P2P group, the processing goes to S1004. If there is no device to be added to the P2P group, the processing goes to S1014. The judgment on whether there is another device to be added to the P2P group or not is judged whether or not the connection processing of Wi-Fi Direct has been executed by a number of times corresponding to the number of devices having the QR codes captured in S1001. If the smartphone 101 operates as the intermediary, the judgment in S1013 may be made whether or not the information on the QR codes captured in S1001 has been provided to GO.

In S1013, if there is no device to be added to the P2P group, and if the smartphone 101 operates as the intermediary, similarly to S810 and S811, the smartphone 101 executes the disconnection processing (S1015) and terminates the processing.

In this embodiment, the device to be GO is determined in accordance with the Intent value. However, the device to be GO may be determined in accordance with a predetermined priority different from the Intent value. For example, the device that displays the QR code captured first by the smartphone 101 may be GO. Also, the device to be GO may be determined as GO on the basis of a service to be executed. For example, to execute the print service in this embodiment, if the printer 103 becomes GO, direct communication can be made between a device that uses the print service and the printer 103. Hence, the printer 103 may be determined to be GO. Alternatively, a user may select a device to be GO by using the smartphone 101.

As described above, with this embodiment, the P2P group can be automatically formed among the devices the QR codes of which have been sequentially captured by the smartphone 101. Accordingly, usability is increased.

Other Embodiments

Also, in the above-described embodiment, the case is described in which the information for setting the communication parameter is exchanged between the devices by using the QR code. However, instead of image capturing of the QR code, wireless communication, such as near field communication (NFC) or Bluetooth, may be used. Alternatively, wireless communication, such as IEEE 802.11ad or TransferJet (registered trademark), may be used.

Also, in the embodiment, the QR code to be read may not be only the QR code displayed on the display unit. For example, a QR code attached in a form of a seal to a casing of a communication device, or a QR code attached to an operation manual or a packaging such as a corrugated cardboard carton or the like used at sale of a communication device may be used. Also, instead of the QR code, a one-dimensional barcode, or a two-dimensional code other than the QR code may be used. Also, instead of machine-readable information such as the QR code, user-readable information may be used. Alternatively, the PC 102 or the printer 103 may have a WEB server function, and may display a QR code on a WEB page.

Also, in the embodiment, the case is described in which the communication between the devices is executed by wireless LAN communication conforming to IEEE 802.11. However, it is not limited thereto. For example, communication may be executed by using a wireless communication medium, such as a wireless universal serial bus (USB), MBOA, Bluetooth, ultra-wideband (UWB), ZigBee, or NFC. In this case, MBOA is abbreviation for Multi Band OFDM Alliance. Also, UWB includes a wireless USB, a wireless 1394, Wireless Networks (WINET), etc.

Also, in the embodiment, the connection processing is executed by using Wi-Fi Direct; however, it is not limited thereto. For example, the embodiment may be applied to a case in which an access point of a wireless LAN provides a communication parameter. Also, the embodiment may be applied to an ad hoc mode. If the embodiment is applied to the ad hoc mode, the application is available by replacing a device to be GO with a device that constructs an ad hoc network first.

Also, in the embodiment, the processing is described in which, if the smartphone 101 operates as the intermediary, the smartphone 101 forms the P2P group with the PC 102 or the printer 103 and the other device participates in the P2P group. However, the smartphone 101 may provide the communication parameter stored in the storage unit 207 as a communication parameter for participating in the P2P group to the PC 102 or the printer 103. For example, it is assumed that the smartphone 101 previously stores a communication parameter for participating in the P2P group formed while the printer 103 is GO. In this case, if the smartphone 101 serves as the intermediary and forms the P2P group between the PC 102 and the printer 103, the smartphone 101 may directly provide the stored communication parameter to the PC 102 without forming the P2P group with the printer 103. The stored communication parameter may be, for example, a credential of Persistent P2P Group of Wi-Fi Direct.

Also, the smartphone 101 may store a communication parameter of a P2P group with which the smartphone 101 has connected in the past in the storage unit 207, and may provide the communication parameter directly to another device. At this time, if a plurality of communication parameters are stored in the storage unit 207, a communication parameter to be provided may be selected in accordance with an instruction by a user. Also, one of communication parameters to be provided may be automatically selected depending on the priority. That is, a communication parameter having the highest priority may be selected. Also, when the smartphone 101 captures a QR code with the image capturing unit 201, the smartphone 101 may retrieve a P2P group corresponding to a communication parameter stored in the image storage unit 207, and the smartphone 101 may allow the device indicated by the QR code to participate in the detected P2P group.

Also, the connection sequence in Wi-Fi Direct is described above as an example. However, it is not limited thereto. For example, the smartphone 101 may be a device operable as AP or STA. In this case, the smartphone 101 may determine whether to operate as AP or STA in accordance with an operation by a user. Then, if the smartphone 101 operates as the intermediary, the smartphone 101 may provide control to inhibit a user from making an operation to instruct the smartphone 101 to operate as AP.

With the above-described embodiment, processing of constructing a wireless network can be simplified when a communication device wirelessly connects a plurality of other communication devices with one another.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-080447, filed Apr. 9, 2015, which is hereby incorporated by reference herein in its entirety.

The invention claimed is:

1. A communication device comprising:
one or more processors; and
one or more memories storing instructions that, when executed by the one or more processors, cause the communication device to:
perform predetermined prevention processing to prevent operating as a base station in communication between a second another communication device and the communication device in a case where the communication device operates in a first mode in which the communication device disconnects from a wireless network according to connection of a first another communication device and the second another communication device to the wireless network to which the communication device is connected, and not perform the predetermined prevention processing in a case where the communication device operates in a second mode in which the communication device remains in a wireless network to which the communication device is connected after the first another communication device and the second another communication device are connected to the wireless network;
connect to a wireless network constructed by the second another communication device as a base station in a case where the communication device operates in the first mode; and
transmit information on the first another communication device to the second another communication device, via the connected wireless network.

2. The communication device according to claim 1, wherein the communication device controls the first another communication device and the second another communication device to connect to a wireless network constructed by the communication device as a base station in a case where the first another communication device, the second another communication device and the communication device are to be wirelessly connected when the communication device operates in the second mode.

3. The communication device according to claim 1, wherein, in a case where the communication device transmits the information on the first another communication device to the second another communication device, the communication device disconnects from the wireless network constructed by the second another communication device as a base station.

4. The communication device according to claim 1, wherein, the predetermined prevention processing is processing of negotiating with the second another communication device so that the communication device operates as a slave station, in a negotiation for determining whether the communication device operates as a base station to construct a wireless network or a slave station to connect to the wireless network.

5. The communication device according to claim 1, wherein the communication device
captures an image, and
acquires the information on the first another communication device from the captured image.

6. The communication device according to claim 1, wherein the communication device acquires information from a one-dimensional code or a two-dimensional code.

7. The communication device according to claim 1, wherein the communication device connects with a wireless network which is constructed by the second another communication device on the basis of a communication parameter received from the second another communication device.

8. The communication device according to claim 7, wherein the communication parameter includes at least one of a service set identifier, an encryption key, an encryption method, an authentication key, and an authentication method.

9. The communication device according to claim 7, wherein the communication parameter is information for making communication conforming to IEEE 802.11 standard.

10. The communication device according to claim 1,
wherein the base station is a group owner of Wi-Fi Direct standard.

11. The communication device according to claim 1, wherein in a case where the communication device is operating in the first mode, the communication device performs the predetermined prevention processing in communication between the first another communication device and the communication device.

12. The communication device according to claim 1, wherein the communication device transmits information on the first another communication device indicated by the acquired information as information on a device that requests wireless connection to the second another communication device.

13. The communication device according to claim 1, wherein the communication device acquires the information on the first another communication device from a captured image.

14. A control method of a communication device, the method comprising:
performing predetermined prevention processing to prevent operating as a base station in communication between a second another communication device and the communication device in a case where the communication device operates in a first mode in which the communication device disconnects from a wireless network according to connection of a first another communication device and the second another communication device to the wireless network to which the communication device is connected, and not perform the predetermined prevention processing in a case where the communication device operates in a second mode in which the communication device remains in a wireless network to which the communication device is connected after the first another communication device and the second another communication device are connected to the wireless network;
connecting to a wireless network constructed by the second another communication device as a base station in a case where the communication device operates in the first mode; and
transmitting information on the first another communication device to the second another communication device, via the connected wireless network.

15. A non-transitory computer readable storage medium storing a program for causing a communication device to perform a process, the process comprising:
performing predetermined prevention processing to prevent operating as a base station in communication between a second another communication device and the communication device in a case where the communication device operates in a first mode in which the communication device disconnects from a wireless network according to connection of a first another communication device and the second another communication device to the wireless network to which the communication device is connected, and not perform the predetermined prevention processing in a case where the communication device operates in a second mode in which the communication device remains in a wireless network to which the communication device is connected after the first another communication device and the second another communication device are connected to the wireless network;
connecting to a wireless network constructed by the second another communication device as a base station in a case where the communication device operates in the first mode; and
transmitting information on the first another communication device to the second another communication device, via the connected wireless network.

* * * * *